UNITED STATES PATENT OFFICE.

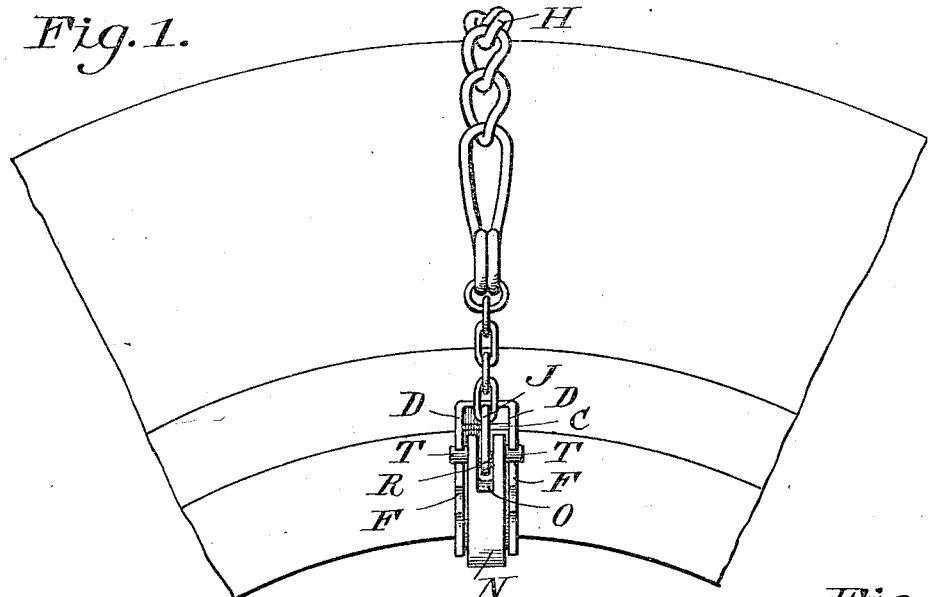
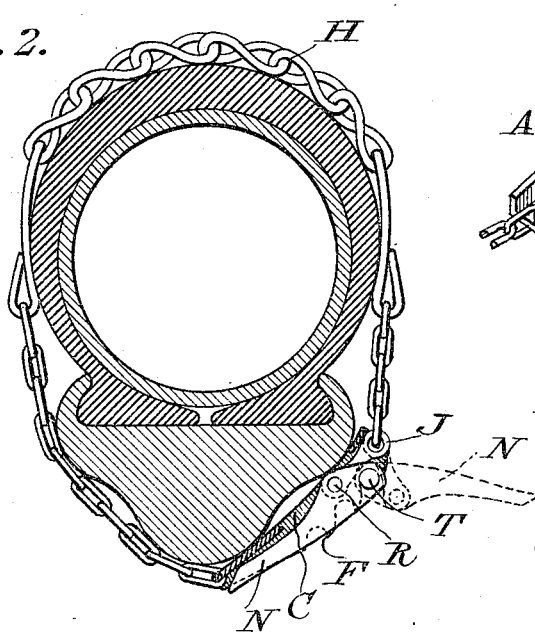
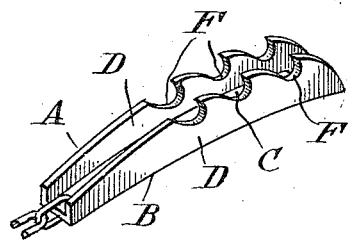
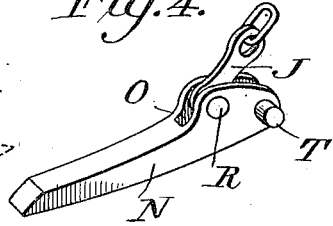
W. O. HARMON.
FASTENER FOR ANTISKID CHAINS.
APPLICATION FILED OCT. 20, 1916.
1,271,464.   Patented July 2, 1918.
Fig. 1.
Fig. 2.
Fig. 3.
Fig. 4.
Inventor
W. O. Harmon

WILLIAM OLIVER HARMON, OF LA PRYOR, TEXAS.

FASTENER FOR ANTISKID-CHAINS.

1,271,464.      Specification of Letters Patent.      Patented July 2, 1918.

Application filed October 20, 1916. Serial No. 126,745.

*To all whom it may concern:*

Be it known that I, WILLIAM O. HARMON, a natural-born citizen of the United States, residing at La Pryor, in the county of Zavalla and State of Texas, have invented certain new and useful Improvements in Fasteners for Antiskid-Chains; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to means for fastening anti-skidding chains about the tread surfaces of tires, and consists of a simple and efficient device of this nature which may be easily and quickly applied to the wheel and as easily removed therefrom.

My invention comprises a simple device of this nature having various details of construction and combinations and arrangements of parts which will be hereinafter fully described and specifically defined in the appended claim.

I illustrate my invention in the accompanying drawings, in which—

Figure 1 is a side elevation of a portion of a wheel showing the application of my invention.

Fig. 2 is a sectional view through the tire and rim showing the device as applied.

Fig. 3 is an enlarged detail perspective view of one of the locking plates, and

Fig. 4 is a detail perspective view of a locking lever.

Reference now being had to the details of the drawings by letter. A designates a plate which has one face B which is concaved and is adapted to conform to the curved rim of a vehicle wheel and is provided with an elongated slot C. Said plate has two parallel walls D provided with oppositely disposed notches F. An anti-skidding chain H is connected to one end of said plate, and N designates a lever which has a slot O at one end, and mounted in registering apertures in the walls of the slotted portion and at one side of the longitudinal center is a pin R upon which a link J is pivotally mounted and which link in turn is connected to one end of the anti-skidding chain.

Projecting from either side of the lever at the slotted end thereof are the fulcrum lugs T which are adapted to engage registering notches in the edges of said plate when it is desired to cause the chain to be drawn taut about the tread surface of the tire. The several series of oppositely disposed notches are provided in order to permit the chain to be adapted for different sized tires.

In operation, the anti-skidding chain is placed about the tire and rim, the lever is inserted in registering notches and when swung in one direction intermediate the flanges of the plate the chain will be drawn taut, the link swinging in the slot in the lever and when the lever buckles, the pull upon the lever will tend to hold the free end of the lever in place within the flanges of the plate. By swinging the lever in the reverse direction, the anti-skidding chain may be released.

By the provision of a simple and efficient fastening means as shown and described, it will be noted that any person not a skilled mechanic may easily and readily apply the device to the tire of a vehicle wheel, when desired.

What I claim to be new is:—

A device for fastening anti-skid chains upon tread surfaces of tires, comprising a plate convexed upon its under surface, and provided with two parallel flanges upon the longitudinal edges thereof, said plate having an elongated slot in the bottom thereof intermediate said flanges and one end apertured to which a chain is fastened, a lever having a widened portion near its pivotal end and which is longitudinally recessed, the walls of said recess being apertured, a pin mounted in said apertures, a link pivotally mounted upon said pin, lugs projecting in opposite directions from the opposite faces of said lever and fulcrumed in notches in the flanges, said link adapted to have a swinging movement in the recess between said lugs and to which link the other end of said chain is adapted to be fastened.

In testimony whereof I hereunto affix my signature in presence of two witnesses.

WILLIAM OLIVER HARMON.

Witnesses:
     A. G. PERSON,
     J. C. POGUE.

Copies of this patent may be obtained for five cents each, by addressing the "Commissioner of Patents, Washington, D. C."